United States Patent [19]
Schreiber

[11] 3,911,651
[45] Oct. 14, 1975

[54] ROW CROP HARVESTING DEVICE

[76] Inventor: Alvin J. Schreiber, Rte. 2, Box 57, Fairmount, N. Dak. 58030

[22] Filed: Aug. 5, 1974

[21] Appl. No.: 494,632

[52] U.S. Cl. ................................. 56/98; 56/14.3
[51] Int. Cl.² ........................................ A01D 45/02
[58] Field of Search ........................... 56/51–119, 56/13.6, 13.5, 15.3, 14.3, 15.8, 192, 27.5; 171/22

[56] References Cited
UNITED STATES PATENTS

| | | | |
|---|---|---|---|
| 441,809 | 12/1890 | Salzman | 56/102 X |
| 2,522,308 | 9/1950 | Silva | 171/22 |
| 2,634,569 | 4/1953 | Raney et al. | 56/14.3 |
| 2,737,770 | 3/1956 | Wigham | 56/98 |
| 2,748,552 | 6/1956 | Pool et al. | 56/10.2 |
| 2,813,390 | 11/1957 | Irvine | 56/27.5 |
| 2,836,026 | 5/1958 | Gray et al. | 56/119 |
| 3,035,387 | 5/1962 | Berill | 56/28 |
| 3,049,852 | 8/1962 | Jacobson | 56/15.3 |
| 3,785,130 | 1/1974 | Gaeddert | 56/98 |

Primary Examiner—Russell R. Kinsey

[57] ABSTRACT

In a soybean harvesting device, a pair of counter-rotating blades are each drivingly supported on one of a pair of a parallel, telescopic drive shafts drivingly mounted to a harvestor suspension frame on the front end of a grain combine high above each soybean row to be harvested. Two universal joints are provided in each of these drive shafts to permit each pair of such cutting blades to have limited movement in a vertical plane transverse to its row to maintain its alignment with the row. Ground shoe assemblies extend from ground engaging position in front of each pair of blades back to a horizontal pivot point behind each set of blades and these assemblies serve to maintain the blades at a proper cutting height with respect to the ground. Drums concentric with and rotating with the blades power belts containing fingers which engage the severed soybean stalks and carry them back to be deposited in any usual or preferred combine intake structure.

17 Claims, 8 Drawing Figures

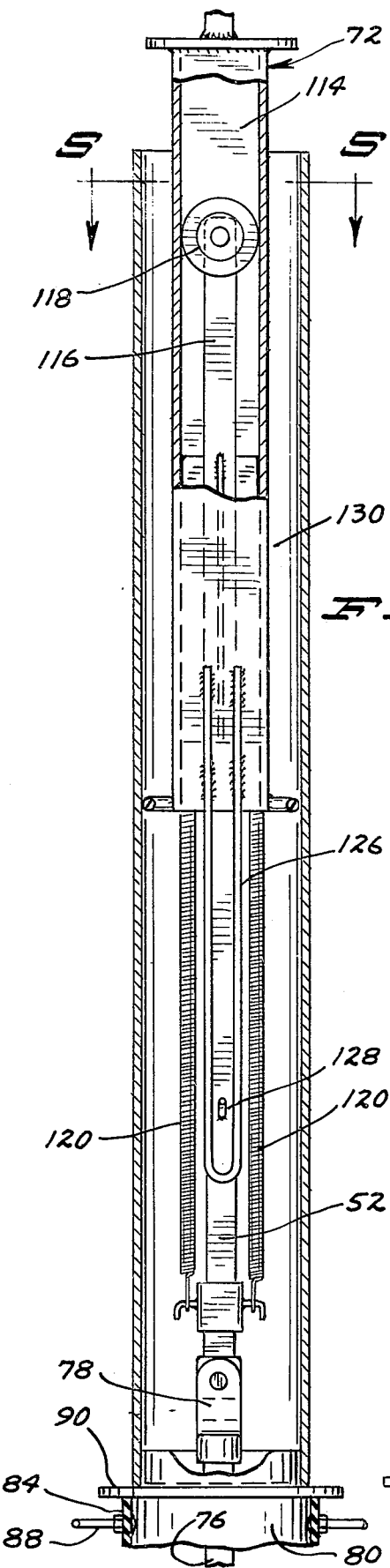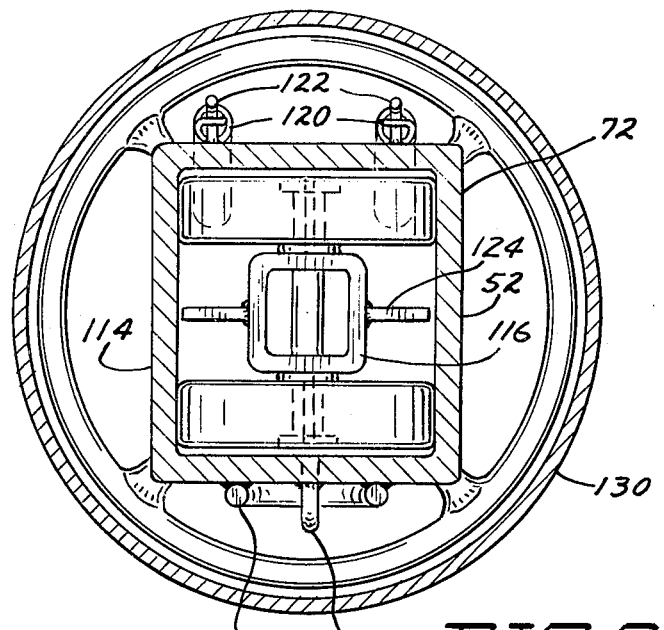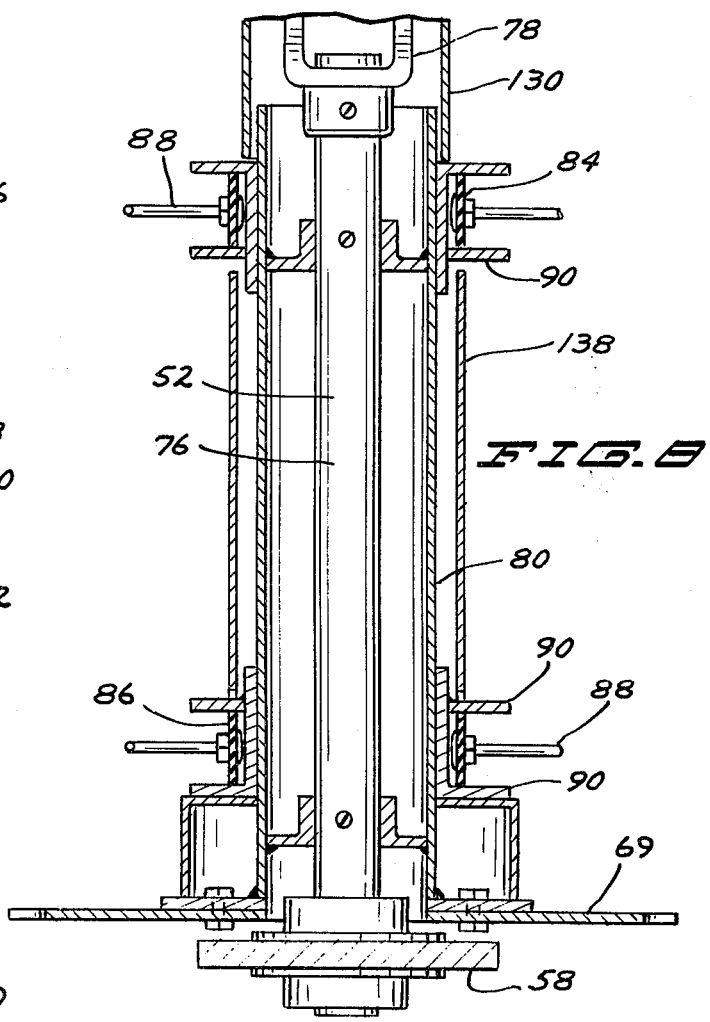
FIG. 4
FIG. 5
FIG. 8

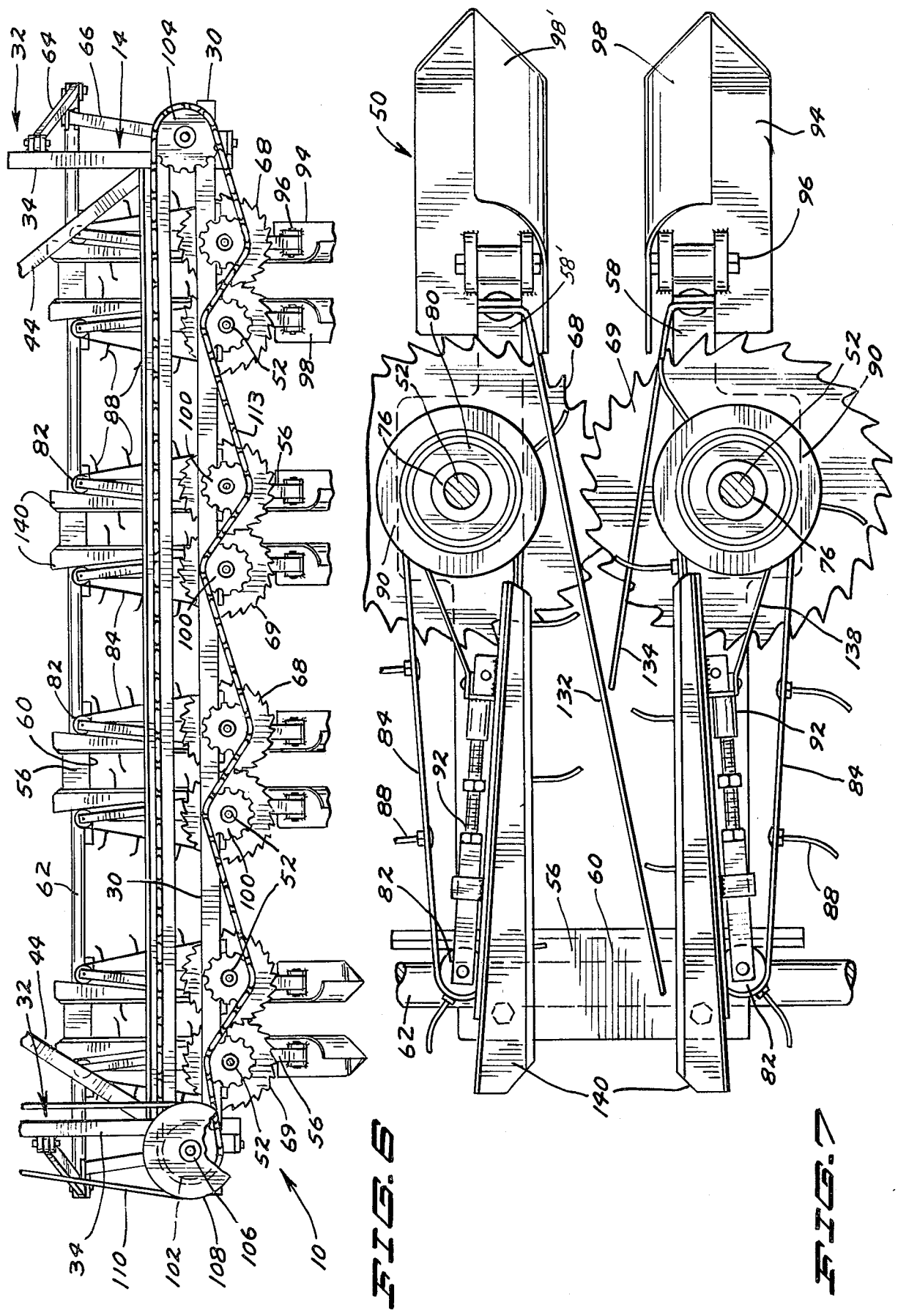

ROW CROP HARVESTING DEVICE

BACKGROUND OF THE INVENTION

This invention has relation to the harvesting of row crops such as soybeans and is designed to reduce the losses in the pick up of the soybean plants from the field.

The typical means of severing soybean plants from the ground is the sickle bar cutter. This mechanism is satisfactory to sever the typical upstanding plants from the ground, and usually a large percentage of these plants will fall naturally back into the screw conveyor mechanism of a typical grain harvesting device. Certain plants, notably "cripples", will not fall back into the normal front end of the grain combine, however, and will be passed over by the combine and lost.

In the case of a poor, short, thin crop, sickle bar cutters are particularly bad and tend to force the weak stalks ahead of themselves. In this situation, up to one-half of a thin crop can fall forward to the ground and pass under a combine when an attempt is made to harvest it with a sickle bar cutter.

Furthermore, sickle bar cutters are notably subject to damage upon encountering rocks, are subject to extensive wear and therefore expensive and time delaying repair, and must necessarily conform to an "average" ground height, thus striking some of the plants too high and others below the surface of the row.

Because it is not possible to accurately position sickle bar cutters with respect to the level of a particular row at a particular moment, when harvesting in wet weather, the wet leaves are shoved ahead of the sickle bar and tend to jam the sickle bar cutter.

In a preliminary search on the invention set out herein, the following prior art was developed:

The patent to D. G. Jacobson, U.S. Pat. No. 3,049,852, granted Aug. 21, 1962, shows a bean harvester including a lower end rotary disc-type cutter, surrounding shields, and rotary conveying fingers for depositing the vines in a combine scoop to the rear of these structures.

A pair of endless belts for conveying row crop plants back to the front end of a harvester is shown in the patent to C. Bevill, U.S. Pat. No. 3,035,387, granted May 22, 1962.

Use of vertical rotatable cylinders to feed row crops to a conventional sickle bar cutter is shown in the patent to W. C. Gray et al., U.S. Pat. No. 2,836,026, granted May 27, 1958.

A single, horizontally disposed lower cutting disc with cooperating chain flights to carry severed row crops back to a harvester is shown in the patent to Seifried, U.S. Pat. No. 3,031,832, granted May 1, 1962.

The patent to H. Kellogg, U.S. Pat. No. 17,223, granted May 5, 1857 shows a vertical drum or cylinder in combination with "sickle blades or knives LLL, being attached to horizontally arranged discs or wheels" which "revolve inwardly toward each other and cut the stalks of standing grain as they enter between ". Revolving curved fingers nnn extend outwardly from the drums and pull the grain into the sickle bar teeth mmm, and then carry the severed grain back toward the combine or harvester.

The patent to W. C. Silva, U.S. Pat. No. 2,529,515, granted Nov. 14, 1950, discloses a celery harvester which uses two intersecting discs below the surface of the ground for severing celery roots. There are two belts to feed the celery stalks back to the harvester after they are cut off.

Forwardly facing ground shoes forming a V-shaped opening for the introduction of stalk crops which are then severed with the use of overlapping disc cutters is shown in the patent to R. R. Raney, et al., U.S Pat. N0. 2,634,569 granted Apr. 14, 1953.

Other more or less pertinent patents which show the state of the art include:

W. T. Campbell, U.S. Pat. No. 1,276,324 granted Aug. 20, 1918

A. I. Becker, U.S. Pat. No. 2,795,314 granted June 11, 1957

W. C. Irvine, U.S. Pat. No. 2,813,390 granted Nov. 19, 1957

I. D. McEachern, U.S. Pat. No. 2,929,185 granted Mar. 22, 1960

I. D. McEachern, U.S. Pat. No. 3,210,920 granted Oct. 12, 1965

In the light of the deficiencies of a standard sickle bar cutter, and in the light of the general unacceptability of the isolated features of the prior art patents set out above, the structure of the present invention was developed.

BRIEF SUMMARY OF INVENTION

A harvester suspension frame is integral with the extends forwardly of a combine for processing the row crop to be harvested. This frame includes a cutterhead suspension bar rigid with the frame of the combine and spaced forwardly of the leading edge of the combine and at a substantial distance above the ground. A cutterhead unit for each of the rows to be cut is pivotally suspended with respect to the cutterhead suspension bar and upper portions of the harvester suspension frame for limited movement in a vertical plane situated transversely to the longitudinal dimension of the rows to be cut.

Each cutterhead unit includes a forwardly open U-shape cutterhead frame. All of these frames are pivotally mounted to the same horizontal, transversely extending cutter unit pivot rod. This pivot rod is suspended from the harvester suspension frame and is situated in adjacent relationship to thr ground but high enough to insure that it will not normally come in contact with the ground. Each of the forward ends of the U-frame is pivotally mounted to a ground engaging shoe carrying a hood shaped to tend to cause any plants which it encounters to be set upright and into position to be cut.

Two three-piece universally jointed, telescoping, cutter drive shafts extend downwardly from the cutterhead suspension bar for each cutterhead unit. Circular cutters are fixedly mounted on bottom portions of each of said shafts and overlap each other slightly. Lower ends of these drive shafts are rotatably mounted in the outer end portions of the U-shape cutterhead frame. Plant stalks feed drums are concentric with the cutters around the cutter drive shafts and extend upwardly from the cutters. Plant stalk feed idler rollers are rotatably mounted with respect to the closed end portions of the cutterhead frames, and plant stalk conveyor belts run on each set of longitudinally aligned drums and rollers and have fingers to carry severed stalks back to position above a screw conveyor intake scoop, or other appropriate or desired intake structure forming a part of the combine itself.

Weight compensating means is provided to support a portion of the weight of the forward end of the cutterhead units so that the ground engaging shoes move but lightly over the ground.

IN THE DRAWINGS

FIG. 4 is an enlarged vertical sectional view taken on the line 4—4 in FIG. 3;

FIG. 5 is an enlarged horizontal sectional view taken on the line 5—5 in FIG. 4 but with parts omitted;

FIG. 6 is a top elevational view of the harvesting device of FIGS. 1 and 2 taken on the line 6—6 in FIG. 2; and with parts omitted, and parts broken away for clarity of illustration;

FIG. 7 is an enlarged horizontal sectional view taken on the line 7—7 in FIG. 1; and FIG. 8 is a vertical sectional view taken on the line 8—8 in FIG. 3.

PREFERRED EMBODIMENT OF THE INVENTION

Figure 1:
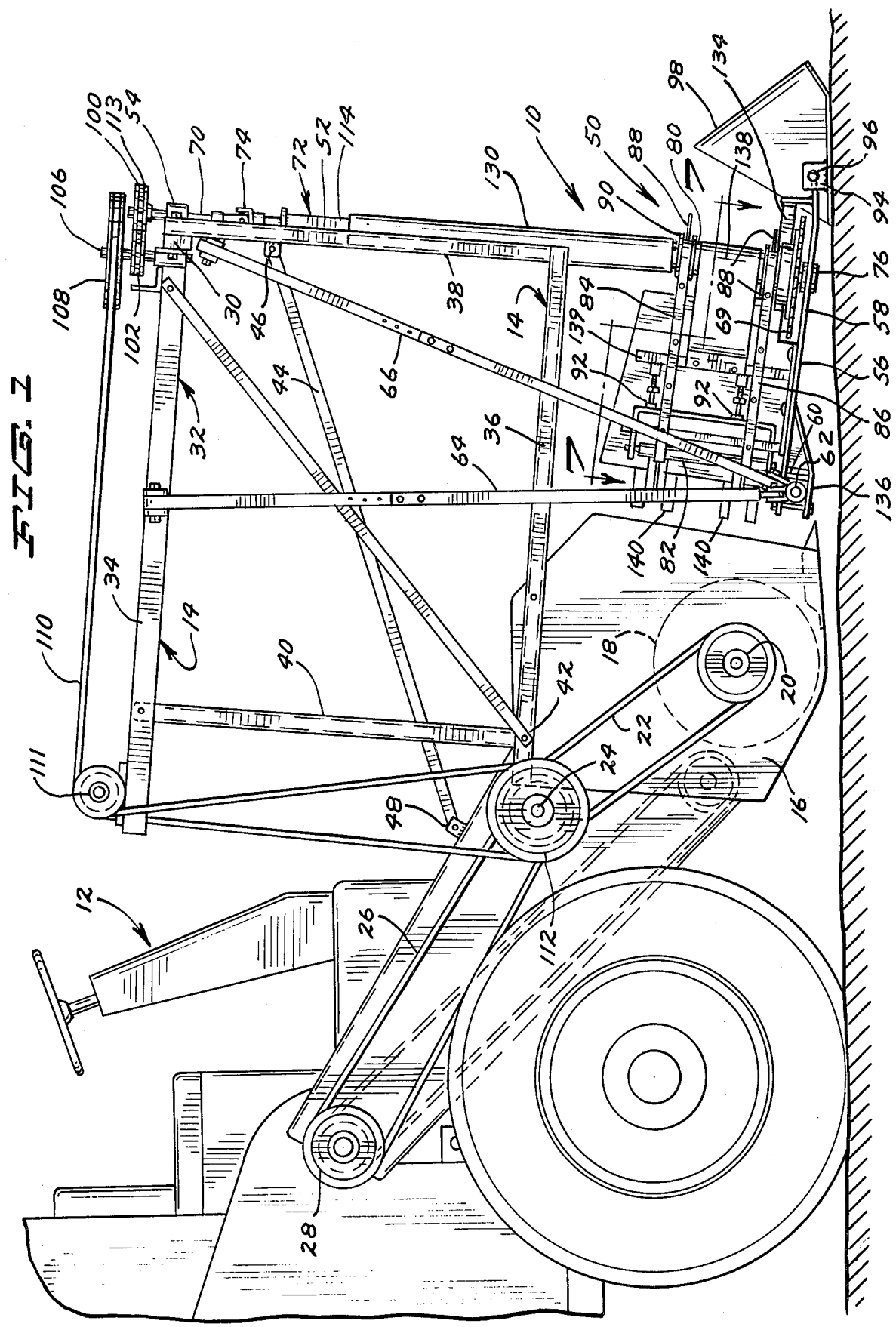
FIG. 1 is a side elevational view of a row crop harvesting device of the invention mounted in operative relationship to the front end of a grain combine.

A row crop harvesting device 10, herein disclosed as being a soybean harvesting device, is mounted with respect to a grain combine 12 through the instrumentality of a harvester suspension frame 14.

The grain combine is disclosed as having an intake scoop 16 in which a center-delivering conveyor screw 18 is rotatably mounted. As shown, this conveyor screw is driven through the instrumentality of a concentric driven pulley 20, an appropriate drive belt 22, and a drive pulley on jack shaft 24. This jack shaft is driven from power source within the grain combine 12 (not shown) through the instrumentality of drive belt 26, an appropriate drive pulley on the jack shaft 24, and drive pulley 28. Power from this jack shaft 24 is used to drive the elements of the row crop harvesting device 10 in a manner to be described.

Harvester suspension frame 14 includes a cutterhead suspension bar 30 rigidly connecting upper forward corners of two parallel spaced apart substantially rectangular suspension bar support frames 32. These frames include an upper support bar 34, a parallel lower support bar 36, a forward upright support bar 38, and a generally parallel rearward upright support bar 40. These suspension bar support frames are fixedly mounted to forward portions of the grain combine 12 as at 42; and these frames, the cutterhead suspension bar 30, and, in fact, the entire harvester suspension frame 14 is locked in rigid fixed relationship with the frame of the grain combine 12 partly through the instrumentality of diagonal tie straps 44 each pinned to one of the forward upright support bars 38 as at 46 and each pinned to the frame of the grain combine as at 48.

A cutterhead unit 50 is suspended from the harvester suspension frame 14 to be capable of being aligned with each of the longitudinally extending rows of soybean plants which are to be harvested. Each of these cutterhead units 50 includes a pair of parallel spaced-apart, three-piece, universally jointed, telescoping, cutter drive shafts 52 rotatably mounted at upper ends thereof in bearings 54 which are fixedly mounted with respect to the cutterhead suspension bar 30.

Each cutterhead unit also includes a forwardly open, U-shape, cutterhead frame 56 including parallel, spaced apart, forwardly extending, cutter frame arms 58, 58' and an integral, rearward transversely extending connecting arm 60. A single cutter unit pivot rod 62 is supported in close, spaced relation to the ground in front of the grain combine 12 to have limited end to end swinging movement with respect to the harvester suspension frame in a vertical plane transverse to the longitudinal dimension of the rows to be cut. This is achieved by suspending the cutter unit pivot rod 62 from each of the upper support bars 34 and forward support bars 38 through the instrumentality of cutter unit pivot rod support straps 64 and 66 respectively.

The lower ends of each of the drive shafts 52 of each cutterhead unit are rotatably mounted on the outer forwardly extending ends of one of the cutter frame arms 58, 58', and one of a pair of circular cutters 68 and 69 are fixedly mounted on each of the drive shafts in closely adjacent spaced relation to upper surfaces of these arms.

Each such drive shaft 52 consists of an upper driven section 70, a center telescoping section 72 connected to the upper section by a universal joint 74, and a lower crop harvesting section 76 connected to the center section by the universal joint 78.

Immediately above each of the circular cutters 68 and 69 on each lower section 76 of the cutter drive shafts 52 are plant stalk feed drums 80, each integral with and concentric with said lower section 76 of one of the cutter drive shafts. Rotatably mounted in parallel spaced apart relationship to each of these feed drums 80 is a plant stalk feed idler roller 82, these rollers being mounted on appropriate frame work extending upwardly from the cutterhead frame 56. Upper and lower plant stalk conveyor belts 84 and 86 run on each pair of longitudinally aligned drums 80 and rollers 82, and each such belt has a plurality of stalk conveying fingers 88 extending outwardly therefrom. Pair of radially extending flanges 90 on the drums 80 serve to fix the vertical position of the conveyor belts 84 and 86 on the drums and rollers, and serve to tend to prevent tangling of the stalks with the roller, drum and belt combination. Appropriate adjusting mechanism such as indicated at 92 is available to maintain a proper tension on the belts 84 and 86 by fixing the idler rollers 82 and the feed drums 80 at a suitable distance from each other.

Ground engaging shoes 94 are pivotally mounted as at 96 to outer ends of each of the spaced apart cutter frame arms 58, 58', and each such shoe integrally carries a respective hood 98', matching hoods on the adjacent shoes being in facing relation to each other and tending to cause any soybean plants and stalks which are not standing upright to be raised upright and held and maintained in upright position as the cutter unit moves along the row to be cut. The ground engaging shoes support forward ends of the arms 58 in fixed relation above the surface of the ground adjacent the row to be cut, and thus properly position circular cutters 68 and 69 as to height of cut. As the ground level of each row varies, this causes a movement up and down of the lower, crop-harvesting sections 76 of the cutter drive shafts 52 with respect to the upper driven sections 70 of those shafts. This difference is effective length of each drive shaft 52 is taken care of by the construction and configuration of the center telescoping section 72 thereof.

The upper driven sections 70 of the cutter drive shafts 52 are rotatably mounted in bearings 54 affixed to the cutterhead suspension bar 30, and the upper end of each such section integrally carries a drive sprocket 100 thereon. Also located in the same plane is a drive sprocket 102 and an idler sprocket 104, each supported on its own shaft which in turn is rotatably mounted in appropriate bearings fixedly positioned with respect to the cutterhead suspension bar 30. As shown, a shaft 106 supports and extends upwardly past drive sprocket 102, and carries driven pulley 108 which receives its driving force through appropriate belts 110 and idler pulleys 111, and from a drive pulley 112 fixedly mounted on rotating jack shaft 24. As perhaps best seen in FIG. 6, a cutter drive chain 113 is in driving and driven relationship to each of the sprockets 100, 102, and 104 in such a manner that the adjacent cutter drive shafts 52 of each cutterhead unit 50 rotate in opposite directions.

To transmit the rotational drive of sprockets 100 to the cutters 68 and 69, center telescoping shaft section 72 includes a bottom opening square tube 114 extending integrally downwardly from a bottom portion of universal joint 74. A rod 116, square in cross section as shown, has anti-friction rollers 118 rotatably mounted on an upper end thereof, and is integrally connected to the upper portion of universal joint 78 at the lower end thereof. Thus as the length of the center telescoping section 72 changes, the rod 116 moves up and down inside of the tube 114. The anti-friction rollers 118 bear against interior surfaces of the tube 114, thus allowing the rotational movement of that tube to be transmitted to the rod 116.

Figure 3:
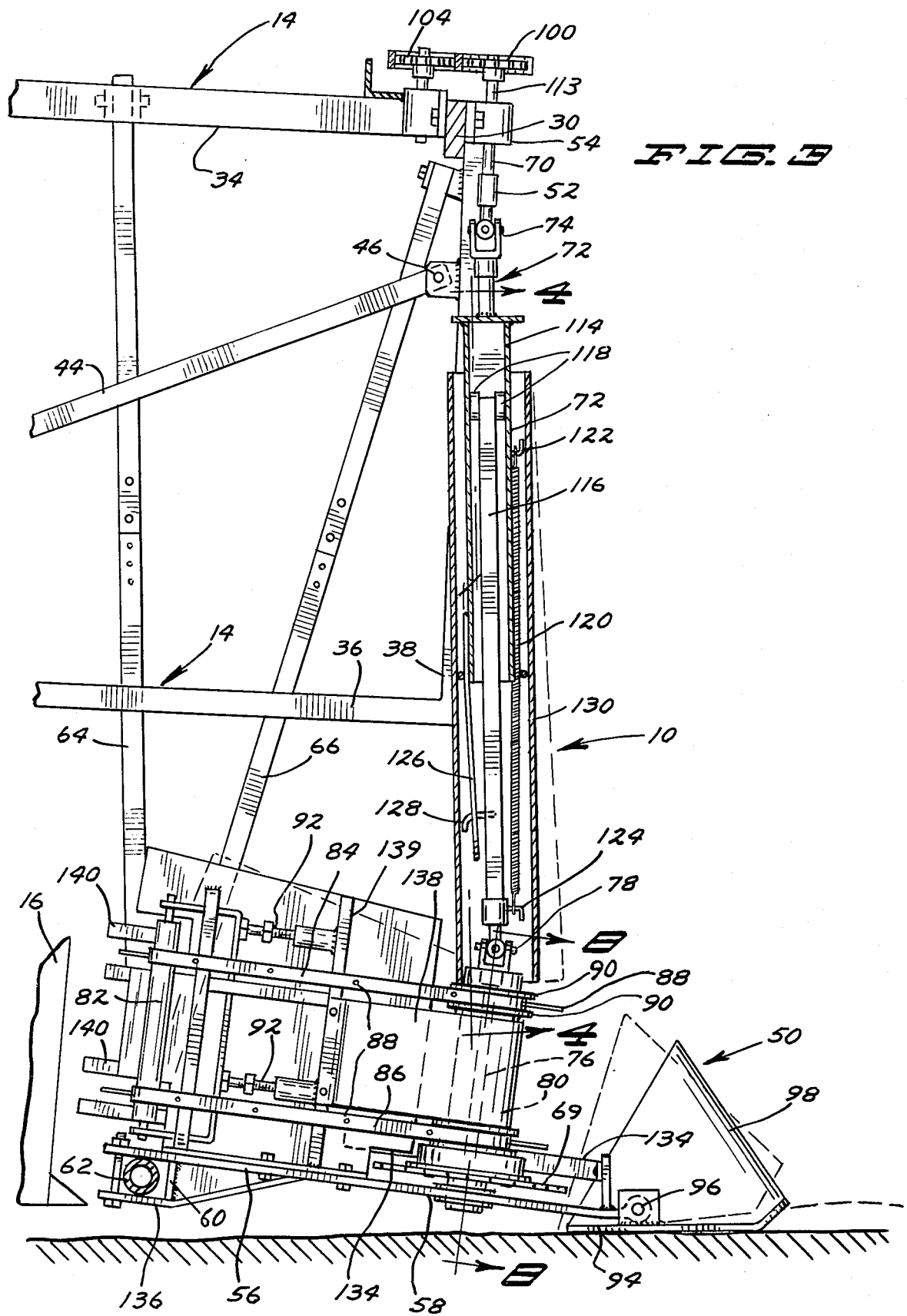
FIG. 3 is an enlarged vertical sectional view taken on the line 3—3 in FIG. 2.

A substantial portion of the weight of the forward part of each cutterhead unit is carried by the drive shafts 52 of that unit in order that the gorund engaging shoes 94, 94 of the unit move lightly and smoothly over the ground. This is accomplished by attaching a plurality of tension coil spring 120 to upper spring supporting hooks 122 extending outwardly from the outside of the tube 114 and to lower spring supporting hooks 124 extending outwardly from lower portions of the rod 116. In order to prevent the rod 116 from coming too far out of the tube 114, a rod limiting loop 126 is integral with and extends downwardly from the square hollow tube 114, and a rod limiting stop pin 128, positioned to be encompassed by the loop 126, extends outwardly from the rod 116, as best seen in FIGS. 3, 4 and 5. Should the ground engaging shoes encounter a severe depression or hole, the rod 128 and these shoes and the entire cutter unit would fall down until this rod limiting stop pin rests on the bottom of the loop 126. Then when the ground was once again encountered by the shoes, the parts would be in position to move back to properly align the cutters 68 and 69 with respect to the soybeans being harvested and to the surface of the ground.

A cylindrical protective shield 130 extends substantially around the entire outer periphery of the center telescoping section 72, and rests at its lower end on the upper flange 90. This tube is free to turn with its cutter drive shaft 52 and serves as a safety shield and also serves to prevent the entanglement of vines being harvested and trash encountered from interfering with the working of the drive shafts and particularly the telescoping section thereof.

A generally U-shape feed drum shield 138 is attached to an upright support strap 139 extending upwardly from each cutter frame arm 58, 58'. Each shield 138 extends around and is spaced from its feed drum 80 to keep the soybean plants from becoming entangled with the plant stalk feed mechanisms.

OPERATION

With the jack shaft 24 being driven from the prime mover of the combine 12, the circular cutters 68 and 69 will be rotated in opposite directions to tend to draw soybean plant stalks into the area between the cutters as the entire harvester and each cutterhead unit 50 is moved longitudinally down the rows to be harvested. As shown, teeth have been provided to facilitate the carrying of the plant stalks into the area of overlap of the cutters, and the cutters are positioned to overlap slightly more than the depth of the teeth. It has been found that optimum operation can be obtained where the lowermost one of the circular cutters 69, is sharpened to a cutting edge and the upper cutters, 69, for example, is not sharpened but serves as a backup anvil or scissor edge against which the sharpened cutter can work.

Should the sprockets 100 associated with the lowermost circular cutter 69 be of the same diameter as the sprockets associated with the upper circular cutter 68, each pair of cutters 68 and 69 will rotate at the same speed but in opposite directions. This can prove satisfactory in carrying out the purpose of the invention; but even better results can be obtained by providing a sprocket 100 associated with circular cutter 69 on its cutter drive shaft 52 which is of smaller diameter than the sprocket 100 associated with its adjacent and overlying circular cutter 68. For example, if sprocket 100 associated with cutter 69 has eight teeth and the sprocket 100 associated with circular cutter 68 has ten teeth, the movement of the sharpened teeth of the circular cutter 69 past the unsharpened or anvil shape of the cutter 68 will be faster than the movement of the anvil portion of this cutter 68. Thus the cutter 68, moving at slower speed, and the roots of the plants being cut in the ground, will serve to tend to maintain the plants in tension so that the faster moving blades of the cutter 69 can sever them.

As the plant stalks move into the area where they will be cut by the cutters 68 and 69, resilient upstanding guide straps 132 and 134 come in contact with the plants and tend to help to center them over the cutting portions of the circular cutters. At the time the stalks are cut off by the cutters, stalk conveying fingers 88, powered by their conveyor belts 84 and 86 have reached out to position to force the stalks back against these resilieint guide straps as they carry the stalks toward the rear. In order to maintain the fingers 88 in operative driving relationship to the soybean stalks after they are cut, guide straps 134 are shorter than guide straps 132, and after the stalks are conveyed out past straps 134, resilient straps 132 continue to urge them in against the conveyor belts 84 and 86 to keep them in contact with these conveyor belts and their associated fingers 88 until such time as the stalks pass off the rear of the cutterhead unit and drop into intake scoop 16 of the grain combine 12 to be handled in any usual or preferred manner. to aid in disengaging fingers 88 from the stalks near the stalk feed idler rollers 82, mutually converging guides 140, 140 are provided.

Figure 2:
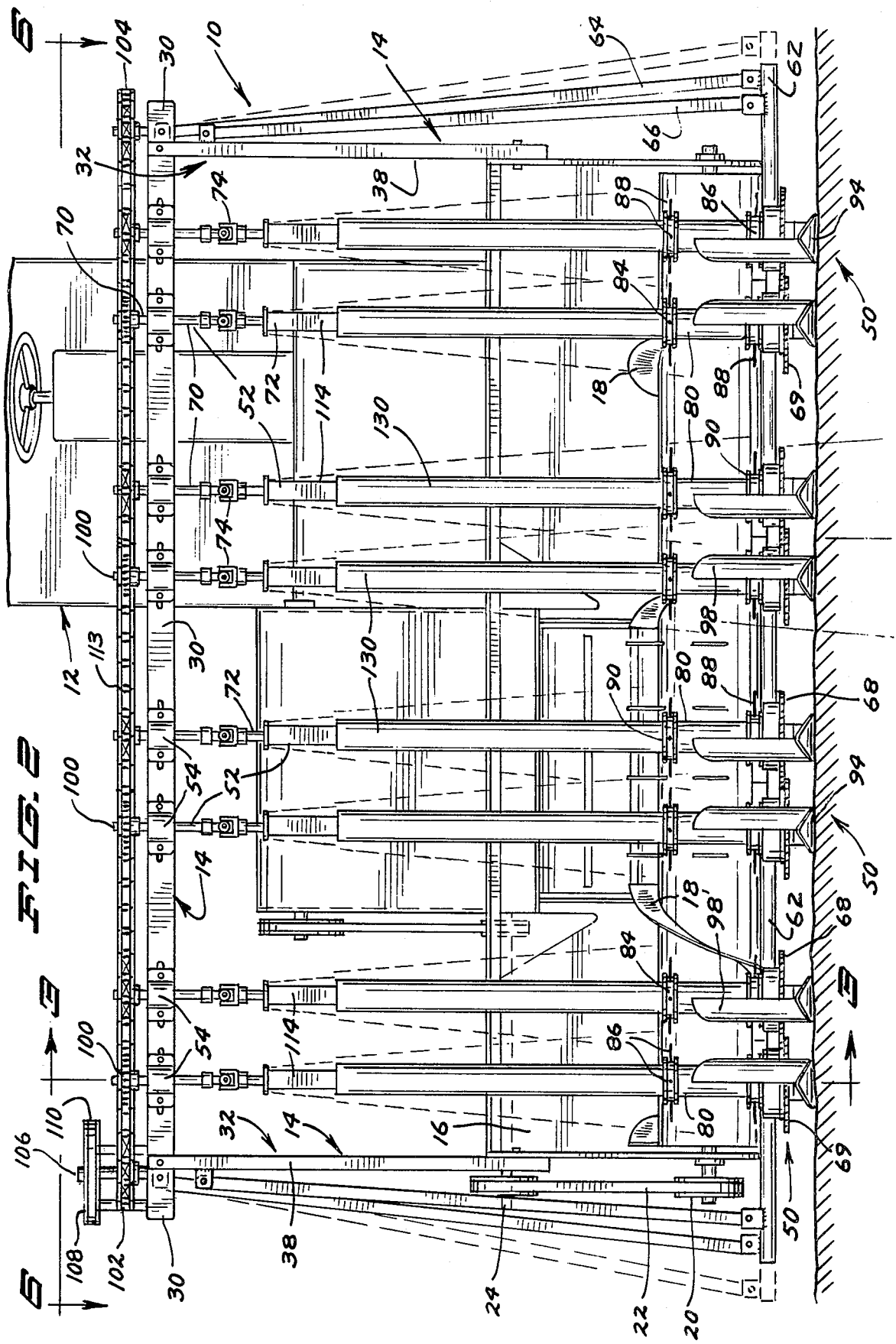
FIG. 2 is a front elevational view of the harvesting device and grain combine of FIG. 1, but with parts omitted for clarity.

The soybeans or other row crop having been planted initially by equipment which precisely fixes the transverse spacing between the rows, it is relatively easy to duplicate this spacing by positioning the center distance between the cutterhead units 50 similarly. This is done by the positioning of the bearings 54 supporting the cutter drive shafts 52, along the cutterhead suspension bar 30, and by pivotally mounting the transversely extending connecting arm 60 of the cutterhead frame 56 to the single cutter unit pivot rod 62 by means of the welded box and bolt structure indicated at 136. As perhaps best seen in FIG. 3, this mounting is such as to let the cutterhead frame 56 pivot in a vertical plane freely about the rod 62 as the ground engaging shoes cause a forward portion of the cutterhead frame 56 to move up and down over the terrain. Because the operator of a combine going through a field cannot position and align the combine as accurately as the rows have been laid out, opportunity for movement of all of the cutterhead units 50 and of the cutter unit pivot rod 62 from side to side in a vertical plane transverse to the longitudinal dimension of the row is provided. This is accomplished through the instrumentality of the cutter unit pivot support straps 64 and 66, being supported to the harvester suspension frame 14 high above the ground. The ground engaging shoes 94, 94 of a particular cutterhead unit maintain their exact and precise transverse alignment with the plants in their row by the action of the circular cutters 68 and 69 centering on the stalks of the row as they press the stalks between them in the process of severing the stalks. Where the rows are precisely aligned with respect to each other throughout the length of the row, this will cause a swinging, as indicated in dotted lines in FIG. 2, of the cutter unit pivot rod 62 and the cutter unit support straps 64 and 66 to either side of the combine. A provision for a total possible swing in one direction of 7 inches and a similar swing in the other direction of 7 inches has been found to be quite effective. In the unlikely event that one of the rows will deviate in its spacing with respect to the other rows, the pivot support at 136 between each cutterhead unit 50 and specifically the cutterhead frame 56 and the pivot rod 62 is loose enough so that a particular cutterhead can swing several inches out of alignment to the left or to the right to compensate for this inaccuracy of the spacing between rows.

The embodiments of the invention in which an exclusive property or privilege is claimed are defined as follows:

1. A row crop harvesting device for attachment to a propelled machine having a forwardly facing intake scoop, said harvesting device including:
   A. a harvester suspension frame integrally supported on said machine and extending forwardly of the intake scoop to position at a considerable distance above at least one row to be harvested;
   B. a cutterhead unit for each row to be harvested, said unit being suspended from the harvester suspension frame for limited movement in a vertical plane transverse to the longitudinal dimension of the row and said unit including:
      1. a cutter unit pivot rod pivotally supported from upper portions of said suspension frame, to be in adjacent, closely spaced relation to the row,
      2. a cutterhead frame pivotally mounted to said pivot rod for movement in a vertical plane aligned with the longitudinal dimension of the row extending forwardly from the pivot rod,
      3. ground engaging means associated with forward portions of said cutterhead frame,
      4. a pair of overlapping circular cutters rotatably mounted in said cutterhead frame to be in fixed vertical relation to the row to be cut pursuant to the operation of said ground engaging means, and
      5. means for causing said cutters to rotate in opposite directions with respect to each other to sever row crop plants from the rows as said machine is propelled along said row;
   C. a plant stalk feed assembly including:
      1. a plant stalk feed drum concentrically mounted above each of the circular cutters,
      2. a plant stalk roller rotatably mounted with respect to said cutterhead frame in parallel spaced relation behind each feed drum,
      3. plant stalk conveyor belts operably mounted on each pair of drums and rollers and having stalk conveying fingers extending outwardly therefrom, and
      4. means for rotating said feed assembly to cause said fingers to move severed stalks from above said cutters rearwardly for delivery over and into said scoop.

2. The harvesting device of claim 1 wherein there are a plurality of cutterhead units suspended from said harvester suspension frame at distances from each other commensurate with the approximate distances between adjacent rows to been harvested; and wherein the cutterhead frame of each cutterhead unit is mounted to a single cutter unit pivot rod in such a manner that each pair of overlapping circular cutters can have limited movement toward and away from the cutters on immediately adjacent units in order to accommodate for variations in the distances between adjacent rows.

3. A row crop harvesting device as set out in claim 2 wherein each such cutterhead frame is U-shape in form, and includes parallel, spaced apart, cutter frame arms extending forwardly from an integral, transversely extending connecting arm, wherein said cutterhead frame is pivotally mounted to said pivot rod adjacent the cutter frame connecting arm and wherein each of said circular cutters is rotatably mounted on a different one of said spaced apart cutter frame arms.

4. A row crop harvesting device as specified in claim 3 wherein said means for causing said cutters to rotate includes a cutter drive shaft operably connected to each of said cutters and extending upwardly therefrom, said drive shaft being rotatably mounted with respect to said suspension frame, and means mounted with respect to said frame for rotating each such drive shaft.

5. The row crop harvesting device as specified in claim 4 wherein said shafts are telescoping, an upper portion of each of said shafts being fixed against longitudinal movement with respect to said suspension frame, and lower portions of said shafts being adapted to move up and down with its circular cutter as said cutter position is maintained fixed with relationship to the crop row pursuant to operation of the ground engaging means.

6. The row crop harvesting device as specified in claim 5 wherein each of said shafts includes an upper section of fixed length, a lower section of fixed length, and a center telescoping section, said sections being joined together with universal joints.

7. The crop harvesting device of claim 6 wherein said center telescoping section of each of said drive shafts includes a hollow tube mounted to one of said universal joints, a rod slidably mounted inside of said tube and mounted to the other of said universal joints, and cooperating means associated with said rod in said tube for permitting longitudinal movement of each with respect to the other while preventing rotational movement of one without commensurate rotational movement of the other.

8. The row crop harvesting device of claim 7 wherein said tube is square in cross section and wherein said cooperating means includes two rollers each rotatably mounted on a common shaft at an outer end portion of said rod, the rollers being of configuration to roll on spaced apart, parallel facing interior surfaces of said tube to permit telescoping action of said tube with respect to said rod and to bear against other surfaces of said tube normal to said rolling surfaces to cause said rod and tube to rotate simultaneously with each other.

9. A row crop harvesting device as specified in claim 5 and means for supporting a portion of the weight of the cutterhead units from the harvester suspension frame, said means including resilient members connected between said upper and said lower portions of said drive shafts 10. A row crop harvesting device as specified in claim 1 wherein said circular cutters are in slightly overlapping contacting relationship with each other, at least one of said cutters having teeth therein, and said overlap being somewhat deeper than the depth of the teeth.

11. A row crop harvesting device as specified in claim 10 wherein both of said circular cutters have teeth, the overlap being greater than the depth of all of said teeth, and wherein one of said cutters has a relatively blunt, shear-like anvil face in overlapping contacting relationship with the other of said cutters which has a sharpened cutter blade face and wherein said cutters rotate in direction to tend to cause the teeth thereon to draw row crop stalks into the position between said cutters as said machine is propelled down a row to be cut.

12. The row crop harvesting device as specified in claim 3 wherein said feed drums are provided with pairs of upper and lower flanges, each pair of flanges being adapted to vertically position one of said feed belts therebetween, and wherein a drum guard is fixedly mounted with respect to said cutterhead frame to extend from position between said feed drum and said feed roller and around and spaced from said feed drum between said upper flanges and said lower flanges.

13. The row crop harvesting device of claim 12 and at least one pair of resilient guide straps each mounted with respect to a forward portion of one of said cutter frame arms of each cutterhead frame and each extending toward the rear and toward the other to initially contact row crop stalks entering said device to center them with respect to the circular cutters, one of said sets of guide straps being substantially longer than the other, said longer straps being effective, after stalks have passed the shorter of said straps to force said stalks against the opposite feed belts and fingers, and to hold the stalks in operative contact with said fingers until said fingers propel said stalks past the cutterhead frame and to a position where they can drop on the intake scoop of said propelled machine.

14. The row crop harvesting device of claim 13 and centering guides fixedly positioned with respect to rear portions of said cutterhead frame and each providing an inwardly diverging surface toward the rear, in position to force the severed stalks gradually away from said stalk conveying fingers so that said fingers can more easily disengage from said stalks as the plant conveying belts carrying these fingers passes around the end of the plant conveying roller at the rear of the cutterhead frame.

15. The row crop harvesting device of claim 7 wherein said suspension frame includes a cutterhead suspension bar mounted transversely to the longitudinal dimension of the rows to be cut; wherein each of said cutter drive shafts is rotatably mounted with respect to said bar, a drive sprocket integral with each such shaft in adjacent relation to said bar, a driven sprocket rotatably mounted with respect to said bar, a drive chain operably associated with each such drive sprocket and said driven sprocket to cause each cutter of each pair of cutters to rotate in an opposite direction with respect to the other cutter of the pair, and means on said propelled machine to drive the driven sprocket.

16. The row crop harvesting device of claim 1 wherein said means for causing said cutters to rotate in opposite directions is operative to cause the lowermost of said cutters to rotate at a higher speed than its upper adjacent cutter.

17. The row crop harvesting device as specified in claim 11 wherein said cutter having the relatively blunt, shear-like anvil face is positioned above the cutter having a sharpened cutter blade face, and wherein said means for causing said cutters to rotate in opposite directions is operative to cause said lower cutter to rotate at a higher speed than said upper cutter.

* * * * *

UNITED STATES PATENT AND TRADEMARK OFFICE
CERTIFICATE OF CORRECTION

PATENT NO. : 3,911,651
DATED : October 14, 1975
INVENTOR(S) : Alvin J. Schreiber It is certified that error appears in the above-identified patent and that said Letters Patent are hereby corrected as shown below:

Column 2, line 27, "the" should be --and--.

Column 3, line 41, "drive" should be --driven-- (First Occurrence).

Column 4, line 41, "pair" should be --pairs--.

Column 4, line 67, "is" should be --in--.

Column 5, line 38, "gorund" should be --ground--.

Column 5, line 54, "rests" should be --rested--.

Column 6, line 66, "to" should be --To--.

*Signed and Sealed this*

*thirtieth* Day of *December 1975*

[SEAL]

Attest:

RUTH C. MASON
*Attesting Officer*

C. MARSHALL DANN
*Commissioner of Patents and Trademarks*